(12) United States Patent
Janakiraman et al.

(10) Patent No.: US 10,003,518 B2
(45) Date of Patent: Jun. 19, 2018

(54) SPAN SESSION MONITORING

(71) Applicant: Cisco Technology, Inc., San Jose, CA (US)

(72) Inventors: Rajagopalan Janakiraman, Cupertino, CA (US); Yibin Yang, San Jose, CA (US); Pags Krishnamoorthy, San Jose, CA (US); Padmanabhan Krishnan, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days. days.

(21) Appl. No.: 14/967,669

(22) Filed: Dec. 14, 2015

(65) Prior Publication Data
US 2016/0099858 A1    Apr. 7, 2016

Related U.S. Application Data

(63) Continuation of application No. 13/942,426, filed on Jul. 15, 2013, now Pat. No. 9,215,147.

(51) Int. Cl.
*H04L 12/26* (2006.01)
(52) U.S. Cl.
CPC .............. *H04L 43/18* (2013.01); *H04L 43/00* (2013.01); *H04L 43/12* (2013.01)
(58) Field of Classification Search
CPC .......... H04L 41/12; H04L 29/06; H04L 47/10
See application file for complete search history.

(56) References Cited

U.S. PATENT DOCUMENTS

| | | | | |
|---|---|---|---|---|
| 7,474,666 | B2* | 1/2009 | Kloth | H04L 43/00 370/235 |
| 7,787,480 | B1* | 8/2010 | Mehta | H04L 12/465 370/401 |
| 7,804,832 | B2* | 9/2010 | Andrews | H04L 12/4675 370/390 |
| 8,165,136 | B1* | 4/2012 | Sharma | H04L 12/2602 370/235 |
| 8,520,540 | B1* | 8/2013 | Foschiano | H04L 43/0852 370/252 |
| 9,215,147 | B2 | 12/2015 | Janakiraman et al. | |

(Continued)

OTHER PUBLICATIONS

Donald Eastlake et al., "RBridges: Further TRILL Header Extensions", Dec. 1, 2011, http://tools.ietf.org/html/draft-ietf-trill-rbridge-options-06, pp. 1-20.

*Primary Examiner* — Andrew Lai
*Assistant Examiner* — Chuong M Nguyen
(74) *Attorney, Agent, or Firm* — Merchant & Gould P.C.

(57) ABSTRACT

A monitoring session associated with a virtual nickname may be established in a TRILL network. A monitoring station may be connected to an edge switch of the TRILL network specifying the virtual nickname for the monitoring session. The monitoring station is set as a destination for the monitoring session and the virtual nickname is flooded throughout the TRILL network. A source may then be configured to the monitoring session by specifying the virtual nickname of the monitoring session without knowing the destination tied to the monitoring session. Network traffic through the source may then be forwarded to the destination tied to the monitoring session.

19 Claims, 5 Drawing Sheets

(56) References Cited

U.S. PATENT DOCUMENTS

| | | | | |
|---|---|---|---|---|
| 2006/0023718 | A1* | 2/2006 | Joly | H04L 45/245 |
| | | | | 370/392 |
| 2010/0054152 | A1* | 3/2010 | Foschiano | H04L 41/0886 |
| | | | | 370/253 |
| 2010/0226381 | A1* | 9/2010 | Mehta | H04L 12/465 |
| | | | | 370/401 |
| 2011/0299413 | A1* | 12/2011 | Chatwani | H04L 12/4625 |
| | | | | 370/252 |
| 2011/0299534 | A1* | 12/2011 | Koganti | H04L 12/4625 |
| | | | | 370/392 |
| 2012/0014386 | A1* | 1/2012 | Xiong | H04L 29/12028 |
| | | | | 370/392 |
| 2013/0003738 | A1* | 1/2013 | Koganti | H04L 61/103 |
| | | | | 370/392 |
| 2013/0266011 | A1* | 10/2013 | Nachum | H04L 45/74 |
| | | | | 370/392 |

* cited by examiner

SPAN SESSION MONITORING

CROSS-REFERENCE TO RELATED APPLICATION

This application is a continuation of U.S. patent application Ser. No. 13/942,426, filed Jul. 15, 2013, now U.S. Pat. No. 9,215,147 which is entirely incorporated herein by reference.

BACKGROUND

In large networks, there exists a need to monitor the communication of network frames. Network traffic may be monitored using SPAN sessions. Each SPAN session is associated with a SPAN source that identifies a network interface whose network traffic is to be monitored. The network traffic is monitored by copying network frames and sending the copies to a remote location known as the SPAN destination. The SPAN destination may be an edge node of the network that receives and monitors the copied network frames.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Figure 1:
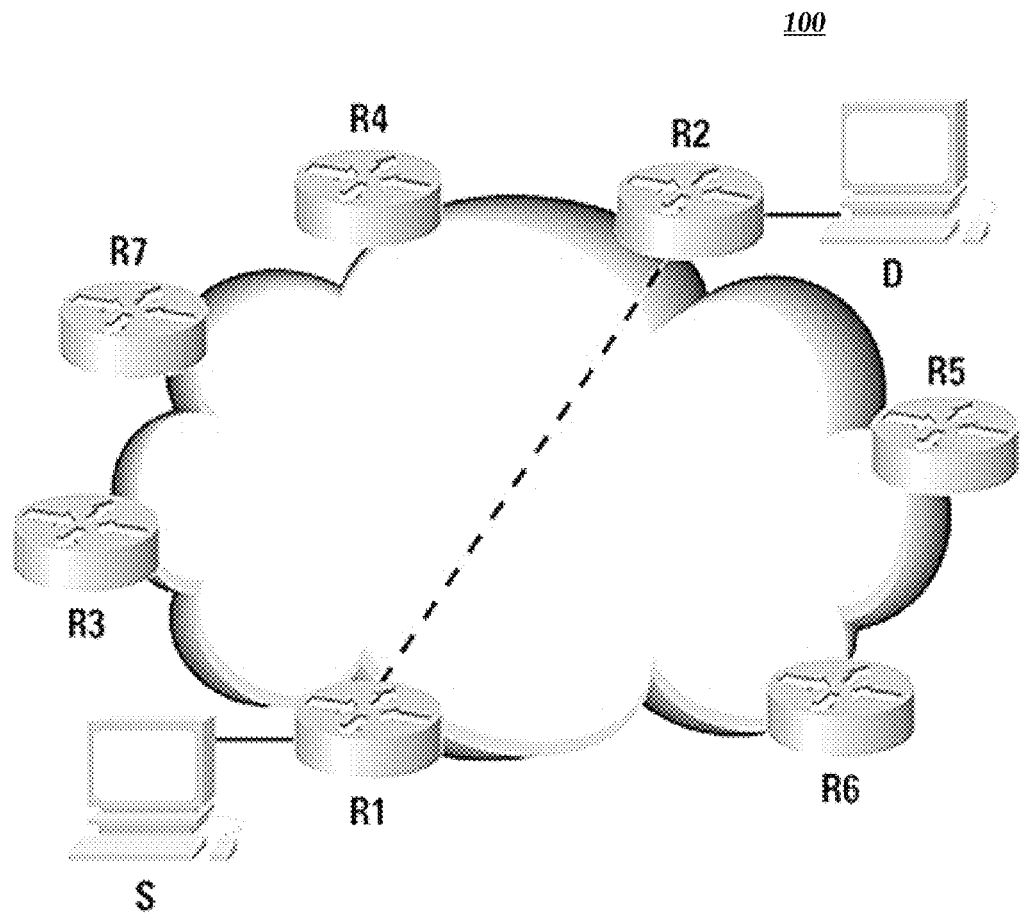
FIG. 1 is a diagram of a TRILL network architecture.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Moreover, heading titles are used to improve readability of this disclosure and are not meant to limit the underlying content to a corresponding header title. Accordingly, the following detailed description does not limit the disclosure. Instead, the proper scope of the disclosure is defined by the appended claims.

I. Overview

There are three common types of SPAN sessions. One SPAN session implementation is known as local SPAN session monitoring. In local SPAN, a SPAN source may be configured with a device or software that monitors the network traffic on the configured device. Scaling network monitoring in a local SPAN is difficult, as each interface that is to be monitored must be manually configured for monitoring.

Another SPAN session implementation is known as RSPAN session monitoring. In RSPAN, for every monitoring session a virtual local area network (VLAN) must be created between the SPAN source and the SPAN destination. When RSPAN is deployed in a TRILL network, the implementation may mandate VLAN pruning on routing bridges (RBRIDGE) of the network to avoid flooding the Transparent Interconnection of Lots of Links (TRILL) network fabric. Copies of monitored frames may need to travel through each switch of the VLAN to reach the SPAN destination, and this increased traffic may unduly flood the ports of the VLAN.

Yet another SPAN session implementation is known as ERSPAN session monitoring. In ERSPAN, a server virtual machine (VM) may host a monitoring application at the SPAN destination. If the VM is running out of processing power or bandwidth for ERSPAN traffic, there may be no way to increase monitoring capacity unless a new span session is added with a new SPAN destination. This requires an increase in hardware and network resources.

Moreover, ERSPAN sessions must be managed end-to-end—the SPAN source must be programmed with the SPAN destination so that it may know where to route the copied frames for monitoring. This requires that large campuses allocate an additional control plane to keep track of each monitoring station. For each new monitoring station, new SPAN destination information must be distributed to all the SPAN sources and switches in order to have targeted sessions to the destinations. This implementation requires a lot of overhead and is, therefore, not easily scalable.

Embodiments of the present disclosure provide a new SPAN session implementation, known as TRILL SPAN or TSPAN. The TSPAN session implementation may address the deficiencies of the SPAN sessions described above by, for example:

i. decoupling the SPAN source from the SPAN destination, thereby relieving the need for a central management of SPAN sessions;

ii. providing plug and pay capability for switches and new monitoring stations without requiring a change in configuration at the SPAN source;

iii. increasing monitoring capacity for the same session by increasing the number of SPAN destinations dynamically; and iv. enabling SPAN destinations to monitor more than one SPAN session.

Consistent with embodiments of the disclosure, a TSPAN monitoring session may be established in a TRILL network. The monitoring session may be associated with a virtual nickname. A monitoring station may be connected to an edge switch of the TRILL network and specify the virtual nickname for the monitoring session. In turn, the monitoring station is set as a destination for the monitoring session identified by the virtual nickname and this information is flooded throughout the TRILL network using Layer 2 ISIS. A source may then be configured to be associated with the monitoring session. The source, once associated with the monitoring session, may be monitored by the monitoring station associated with the monitoring session. A span copy of the Network traffic passing through the source will be encapsulated into a TRILL packet with the destination specifying the virtual nickname of the monitoring session without knowing the destination tied to the monitoring session. In this way, network traffic through the source may be forwarded to the destination tied to the monitoring session.

Accordingly, network frame monitoring may be provided by plugging in monitor stations to any set of switches with minimal configuration and administration on the rest of the network. Monitoring stations may be added on the fly to increase monitoring capacity. Embodiments of the present invention may also provide for one SPAN session to be monitored by multiple stations (for load balance and redundancy) and one station to monitor multiple sessions. Finally, though embodiments of the present disclosure reference a TRILL network implementation, a FabricPath network implementation may also be used.

II. The Trill Network a. Overview

As the name suggests, a TRILL SPAN session may be implemented in a TRILL network. Transparent Interconnection of Lots of Links (TRILL) is an Internet Engineering Task Force (IETF) protocol standard that uses Layer 3 routing techniques to create a large cloud of links that appear to IP nodes to be a single IP subnet. It allows a fairly large Layer 2 cloud to be created, with a flat address space, so that nodes can move within the cloud without changing their IP addresses, while using all the Layer 3 routing techniques that have evolved over the years, including shortest paths and multipathing. Additionally, TRILL supports Layer 2 features such as Virtual Local-Area Networks (VLANs), the ability to auto-configure (while allowing manual configuration if so desired), and multicast/broadcast with no additional protocol.

Additionally, TRILL is evolutionary in the sense that an existing Ethernet deployment, where the links are connected with bridges, can be converted into a TRILL cloud by replacing any subset of the bridges with devices implementing TRILL. Devices implementing TRILL are called Routing Bridges, or RBridges. TRILL allows the ease of configuration of Ethernet while benefitting from the routing techniques provided at Layer 3. It also coexists with existing bridges. It is not necessary to replace all the bridges in an Ethernet, but the more bridges replaced by RBridges, the better the bandwidth usage and the more stable the cloud becomes.

The TRILL standard creates a cloud with a flat Ethernet address, so that nodes can move around within the cloud and not need to change their IP address. Although nodes attached to the cloud perceive the cloud as an Ethernet while the packet is traversing the cloud, it is encapsulated with a TRILL header, which like a Layer 3 technology, contains a source (ingress RBridge), destination (egress RBridge), and hop count. The addresses in the TRILL header, also called nicknames, are 16 bits, enabling a TRILL campus to support 64,000 RBridges. Transit RBridges do not learn about location of end nodes—only the existence of, and path to—other RBridges.

b. Operating Environment

FIG. 1 shows the basic concepts in TRILL handling a unicast packet where the location of the destination is known. TRILL Network 100 may comprise RBridges (R1-R7). RBridges may run a link state routing protocol, which gives them knowledge of the topology of TRILL network 100, consisting of the RBridges and the links between RBridges. Using this protocol, an RBridge calculates shortest paths from itself to other RBridges, as well as trees for delivering multi-destination traffic.

When, for example, an RBridge, R1, receives an Ethernet frame from an end node S, addressed to Ethernet destination D, R1 encapsulates the frame in a TRILL header, addressing the packet to the RBridge R2, to which D is attached. The TRILL header contains an "ingress RBridge" field (R1), an "egress RBridge" field (R2), and a hop count. Then, when R2 receives the encapsulated packet, R2 removes the TRILL header and forwards the Ethernet packet on to D.

R1 is able to determine that R2 is the correct egress RBridge for destination D by learning the correspondence between (ingress RBridge, source MAC address) when the egress RBridge decapsulates a packet. If R1 does not know where the destination MAC is located, R1 encapsulates the packet in a TRILL header with the multi-destination flag set, indicating that it should be transmitted through a tree to all the RBridges.

c. Trill Header

Figure 2:
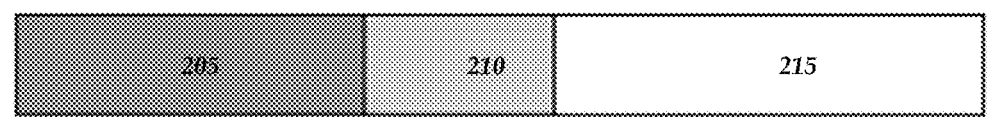
FIG. 2 is a diagram of a TRILL header in a TRILL network.
Figure 2:
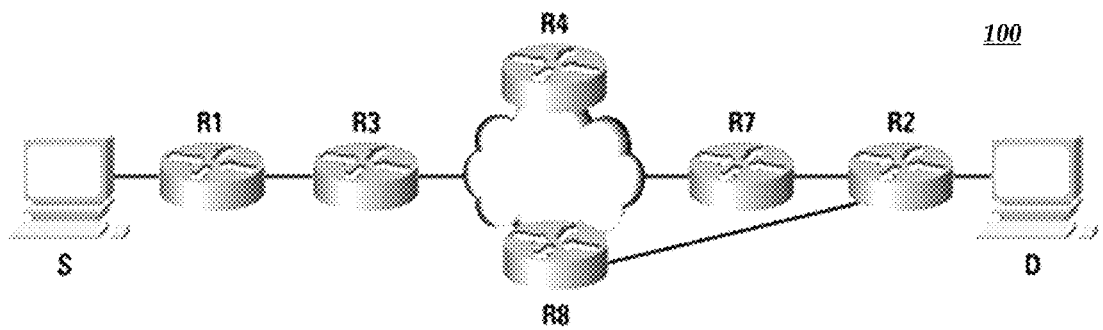

FIG. 2 illustrates an embodiment of a Header 200 for a packet of information being communicated over TRILL Network 100. Header 200 may comprise an Outer Header 205, a TRILL Header 210, and an Inner Header 215. The main fields in the TRILL header 210 may comprise an ingress RBridge nickname (16 bits), egress RBridge nickname (16 bits), hop count (6 bits), and a multi-destination flag bit (1 bit). A typical Layer 3 header would contain a source, a destination, and a hop count. Thus, the TRILL header is an encapsulation header with flat 16-bit addresses. A process through which RBridges obtain "nicknames" is described below.

In addition to the TRILL header, when RBridge R1 is forwarding a TRILL-encapsulated frame to neighbor RBridge R2, there is an additional header that is specific to the type of link connecting R1 and R2. Although TRILL carries Ethernet inside, a link between two or more RBridges could be an arbitrary type of link; for example, besides Ethernet, it could be a Point-to-Point Protocol (PPP) link, an IP or IP Security (IPsec) tunnel, Multiprotocol Label Switching (MPLS) path, etc.

If the link is an Ethernet link, outer header 205 may be an Ethernet header. If it is a PPP link, outer header 205 may be a PPP header. The outer Ethernet header (on an Ethernet link) may serve two purposes. First, if there are bridges (not RBridges) on the link, they will perceive the packet as a normal Ethernet packet, and forward it through the spanning tree. The learning tables of the bridges on the link will see only the addresses of the RBridges on that link.

Second, it allows R1, when forwarding onto a link with multiple neighbors (say R2 and R3), to specify which of R2 or R3 is chosen by R1 to forward the packet by unicasting the packet to the chosen next-hop RBridge. For example, it could be that both R2 and R3 are equal costs to the destination, so R1 would need to specify which of them should forward the packet. Otherwise, both might forward the packet, and the packet would be duplicated.

In summary, as illustrated in FIG. 2, a TRILL-encapsulated packet might have three headers:

i. The outer header 205, or hop-by-hop header, which is stripped off at each hop, is specific to the type of link connecting neighbor RBridges, and, when forwarded between R1 and R2, it specifies R1 as source and R2 as destination;

ii. The TRILL header 210, which similarly to a Layer 3 header remains in place as the packet travels from the first RBridge to the last RBridge, specifying the first RBridge (the one that encapsulated the packet with a TRILL header) as the ingress RBridge, and the last RBridge (the one that will decapsulate the packet) as the egress RBridge; and iii. The inner Ethernet header 215, which specifies the communicating end-node pair as source and destination.

Again referring to FIG. 2, assume S transmits an Ethernet packet to D. In inner Ethernet header 205, Source=S, Destination=D. R1 encapsulates it with a TRILL header 210, where ingress RBridge=R1 and egress RBridge=R2. R1 forwards it to R3, putting on a link header appropriate to the link. If the link is an Ethernet link, the outer Ethernet header will indicate Source MAC=R1_MAC, D_Mac=R3_MAC. When R3 forwards to R7, R3 leaves the TRILL header as is (other than decrementing the hop count), strips the outer MAC header, and puts in a new outer MAC header indicating S=R3_MAC, D=R7_MAC. Likewise, R7 forwards to R2. If it is a PPP link, there is no source or destination. When R2 forwards to D, R2 strips off the TRILL header and D sees the Ethernet packet exactly as transmitted by S.

d. VLANs

Ethernet has a concept known as a Virtual LAN (VLAN), which partitions communities of end nodes sharing the same infrastructure (links and bridges), such that end nodes in the same set can talk directly to each other (using Ethernet), whereas those in different VLANs have to communicate through a router. IP nodes, although generally unaware of Ethernet VLAN tags, perceive different VLANs to be different IP subnets.

Typically, a bridge is configured with a VLAN for each port, and the bridge adds a tag to the Ethernet header that indicates which VLAN the packet belongs to. A bridge with a port that is configured to be VLAN x will deliver only packets tagged as VLAN x to that port, and will usually strip the VLAN tag before forwarding.

The original Ethernet standard did not have a VLAN concept. In today's Ethernet standard, each packet must be associated with a VLAN. A bridge might be configured with a default VLAN for a port, meaning that if no VLAN tag is in the packet, the bridge will treat it as if it is that default VLAN.

e. Link State Protocols

A link state protocol is a routing protocol in which each router R determines who its neighbors are, and floods (to the other routers) a packet, known as a Link State Packet (LSP), that consists of information such as "I am R," and "My neighbor routers are X (with a link cost of c1), Y (cost c2), and Z (cost c3)." The commonly deployed link state protocols are Intermediate System-to-Intermediate System (IS-IS) and Open Shortest Path First (OSPF). IS-IS works well for TRILL because its encoding easily allows additional fields, and IS-IS runs directly on Layer 2, so that it can auto-configure, whereas OSPF runs on top of IP and requires all the routers to have IP addresses.

Figure 3:
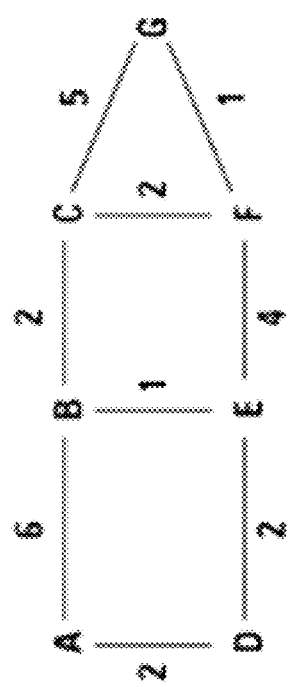
FIG. 3 is a link state diagram for a TRILL network.
Figure 3:
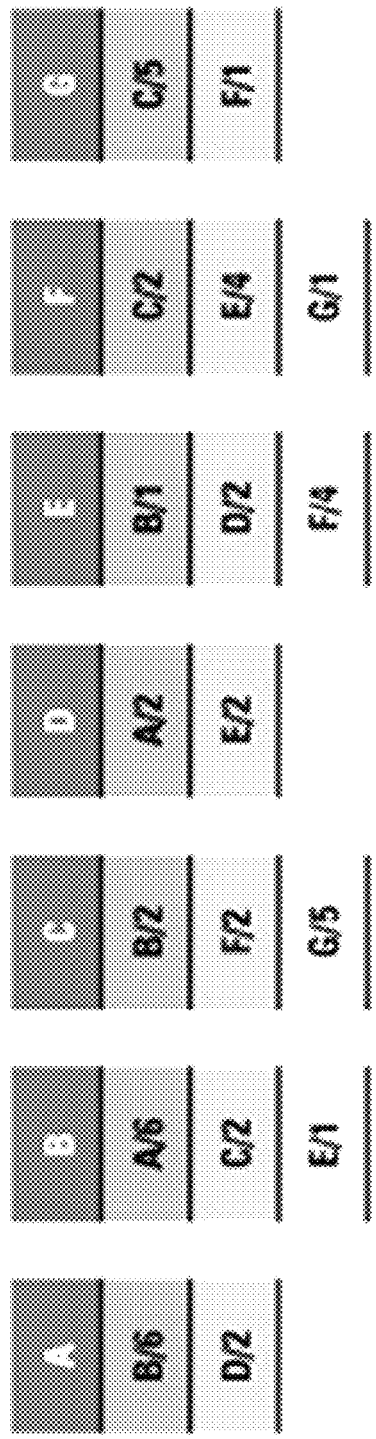

FIG. 3 shows a small network (at the top) consisting of 7 routers. In the bottom half of the figure, the LSP database is shown; all the routers have the same LSP database because they all receive and store the most recently generated LSP from each other router. The LSP database gives all the information necessary to compute paths. It also gives enough information for all the routers to calculate the same tree, without needing a separate spanning-tree algorithm.

f. Acquiring Nicknames

Given that the most recently generated link state packet of each RBridge is flooded to, and stored by, each other RBridge, it is possible to spread other information through the link state packets, such as a protocol for acquiring a unique nickname. Each RBridge chooses a nickname at random, avoiding nicknames already acquired by other RBridges (as discovered by examining the LSP database).

If two RBridges choose the same nickname, there is a tie-breaker, based on configured priority and 6-byte system ID. One of the RBridges gets to keep the nickname and the other RBridge has to choose another nickname that appears not to be in use.

It is possible to configure RBridges with nicknames, in which case a configured nickname takes priority over one that was randomly chosen. And in the case of misconfiguration, where two RBridges have been configured with the same nickname, again, ID and priority choose a winner, and the other one has to choose a different nickname.

An RBRIDGE can emulate virtual nodes connected to it by choosing a nickname to represent the virtual node. In this case, the nickname acquired is termed as "virtual nickname." One of the use cases for representation of a virtual node is a Port-channel which is connected to multiple RBRIDGEs. Here, the port-channel is represented by a virtual nickname and each RBRIDGE advertises reachability to this virtual nickname, III. Trill Span Embodiments of the present disclosure provide a SPAN session implementation, known as TRILL SPAN or TSPAN, to be used over a TRILL network, such as TRILL network 100. In the TSPAN implementation, a pool of RBridge virtual nicknames may be allocated to host SPAN sessions. Each RBridge virtual nickname may represent one SPAN session. A monitoring station may be connected to any corresponding network infrastructure, such as a network switch, associated with an RBridge of TRILL network 100. The monitoring station may then select an RBridge virtual nickname for the SPAN sessions it would like to monitor.

For example, when the monitoring station is discovered or configured onto the switch, an administrator may tie the switch to an RBridge virtual nickname associated with a SPAN session. Once the virtual nickname is configured to the switch, the switch may announce the virtual nickname throughout the nodes of TRILL network 100.

Much like a nickname used in TRILL header 200, the announcement of the virtual nickname gives the impression to other RBridges of TRILL network 200 that a node with the virtual nickname exists and is reachable through the advertising switch. In this way, the monitoring station becomes the SPAN destination for the SPAN session associated with its virtual nickname.

In addition to the SPAN destination, each SPAN session has a SPAN source as well. To tie the SPAN source to the SPAN session, the source switch (for which the network traffic is to be monitored) may be configured with the SPAN session nickname. It is not necessary, in the TRILL SPAN implementation, to configure the SPAN source with the identity of the SPAN destination. Rather, by configuring the SPAN source with the SPAN session nickname, TRILL network 100 will employ regular TRILL multipathing to route the monitored network packets to each SPAN destination associated with the SPAN session.

In this way, the SPAN source need only know the nickname of the SPAN session and the TRILL multipathing determines the SPAN destinations associated with the SPAN session. Furthermore, to increase a capacity for the SPAN session, additional monitoring stations can be added to any edge node of TRILL network 100 and be configured as an additional span destination for that session without requiring an update to the SPAN source configuration.

For example, since the SPAN source of a SPAN session may be configured to identify the SPAN session, it does not need to be reconfigured each time a new monitoring station is added to the SPAN session. Rather, as mentioned above, the TRILL multipathing may employ load balancing techniques to determine which SPAN destination of the SPAN session to best route the monitored network frame from the SPAN source.

The TRILL multipathing may be able to determine the SPAN destinations for each monitored frame by reading TRILL header 210 encapsulated in each frame. For a Closet Network topology, the paths from one leaf node to any of the other leaf nodes may be equal cost. As such, all paths may be used by the session nickname. In a regular TRILL campus, the monitoring stations may be placed centrally based on the network topology.

Once the SPAN source is tied to a SPAN session, it may begin forwarding a copy of its network traffic to the SPAN session without necessarily knowing where the ultimate SPAN destination may be. For example, the SPAN source may copy its packets and encapsulate a TRILL header to each of those packets with the SPAN session's virtual nickname.

Since the SPAN source may already be part of TRILL network 100, the packets of information it communicates may already be encapsulated with TRILL header 210. If this header is to be modified to reflect a new destination, then the monitoring station may not be able to determine the original destination of the packets. Thus, various embodiments of the present invention may preserve the original TRILL header of the packets and add an outer TRILL header to those packets with the SPAN session's nickname.

For example, the outer TRILL header may be a unicast frame, and the monitored packet may not be parsed further (for fetching the inner VLAN in case of pruning). In this way, the monitored packet is copied and the copy is forwarded to the SPAN destination and received by the corresponding monitoring station as dictated by the outer TRILL header in the same way an inner TRILL header would have led the packet of information to its intended destination. The monitoring station may, in turn, decapsulate the outer TRILL header and may monitor the original packet with its corresponding inner TRILL header intact. By analyzing the inner TRILL header, the monitoring station may be able to provide information associated with the packets intended destination, even though the packet was rerouted to the monitoring station.

On a SPAN destination switch, there may be two possibilities for receiving the monitored packets based on the capability of the corresponding monitoring station. In some embodiments, the monitoring station set as the SPAN destination may not be capable of decapsulating the outer TRILL header and parsing the inner header. Here, the monitoring station behaves as an End Station with the attached switch proxying for the monitoring station. Outer TRILL header 210 may be decapsulated in the attached switch and the inner frame forwarded to the monitoring port through an ACL redirect by matching on the egress RBridge field.

In some other embodiments, the monitoring station set as SPAN destination has the capability to parse and decapsulate the TRILL header and monitor the inner frame. In this case, the monitoring interface may be treated as an RBridge interlink and may forward the traffic with TRILL header added by the span source out of this link to the monitoring station. In this way, the server may have more visibility of the traffic by looking at the TRILL header. Information that may be particularly useful includes the Source RBRIDGE, which provides the information on the span source switch and the destination RBRIDGE holding the span session ID. Additionally, a 1588 timestamp may be added when the timestamp is integrated in TRILL header 210.

Figure 4:
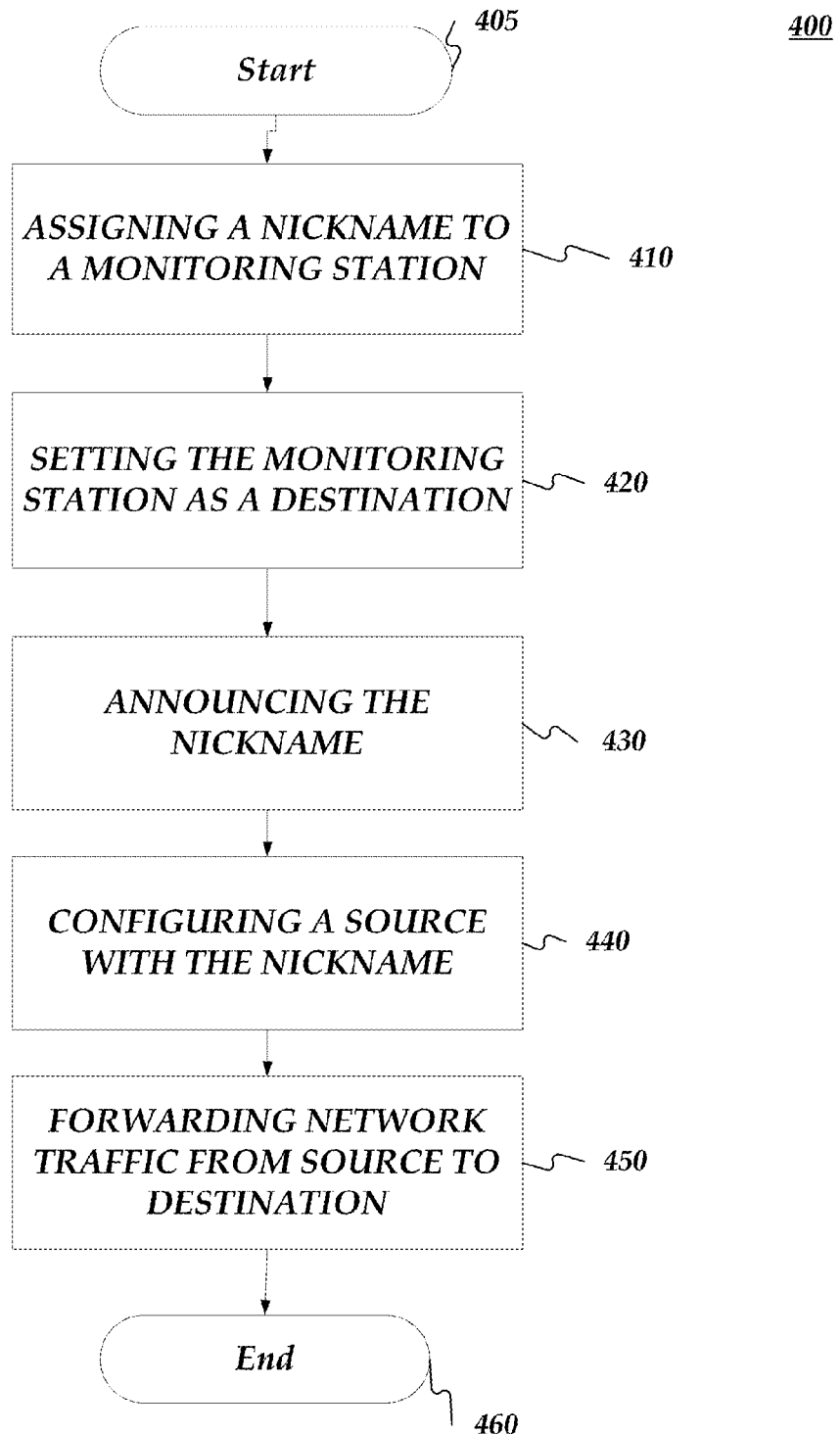
FIG. 4 is a flow chart of a method for flexible and scalable network monitoring.

FIG. 4 is a flow chart setting forth the general stages involved in a method 400 consistent with an embodiment of the disclosure for accelerating network convergence. Method 400 may be implemented by, for example, a server 500 as described in more detail below with respect to FIG. 5. Example implementations of the stages of method 400 will be described in greater detail below.

Method 400 may begin at starting block 405 and proceed to stage 410 where server 500 may assign a virtual nickname associated with a monitoring session to a monitoring station connected to an edge node of network 100. For example, server 500 may allocate a plurality of virtual nicknames for a plurality of monitoring sessions. Then, when a monitoring station connects to network 100 from an edge node of network 100 (e.g., a switch of network 100), the edge node may be configured to be associated with a monitoring session by, for example, specifying a virtual nickname associated with the monitoring session.

Once the edge node is configured to the monitoring session, the monitoring station connected to that edge node may receive network traffic that is monitored by the monitoring session. Consistent with embodiments of the disclosure, a monitoring station may be assigned more than one nickname corresponding to more than one monitoring session. In this way, it may receive the network traffic of several monitoring sessions. Moreover, more than one monitoring station may be assigned to one nickname corresponding to one monitoring session. In this way, the capacity of a monitoring session may be easily expanded by adding monitoring stations to a monitoring session.

From stage 410, where server 500 assigns a virtual nickname, method 400 may advance to stage 420 where server 500 may set the monitoring station as a destination for a network frame to be monitored by the monitoring session. In various embodiments of the present disclosure, monitoring stations may be automatically discovered if they use a common pool of mac addresses. So, if a newly discovered mac address belongs to a mac address within the common pool, binding logic on the switch associated with the monitoring station may automatically tie a nickname associated with the switch to the monitoring station. In this way, the virtual nickname may only need to be configured to the switch connected to the monitoring station. Then, the monitoring session associated with the virtual nickname may automatically determine that the monitoring station connected to the switch is a destination for monitored network traffic. In this embodiment, the user may not need to configure the span destination related configuration on the switch attached to the monitoring session.

Once server 500 sets the monitoring station as the destination in stage 420, method 400 may continue to stage 430 where the edge network node (e.g., the switch) may announce that it is tied to the nickname assigned to the monitoring station. For example, having the monitoring station set as the destination for the monitoring session, the edge network node may flood reachability to the virtual nickname corresponding the monitoring session. In this way, any packet header that specifies the virtual nickname as, for example, a packet destination, may be forwarded to the switch associated with the monitoring station assigned to the virtual nickname. When more than one monitoring station is assigned to the virtual nickname, regular TRILL multipathing and load balancing may be used to determine the most efficient switch to send the packet to.

Having established a monitoring session with a destination, method 400 may proceed to stage 440 where server 500 may configure a source to be monitored by the monitoring session. Consistent with embodiments of the present disclosure, source that is being monitored need not know the destination that receives the monitored network traffic. Rather, all the source would need to know is the monitoring session virtual nickname. From there, the regular TRILL multipathing may determine which switch to forward the monitored network to. Thus, to configure the source, only the monitoring session's virtual nickname may need to be specified. From there, and as will be discussed with reference to method stage 450 below, the source may be operative to forward replicated network packets through network 100 with their destination set as the virtual nickname. More than one source may be configured to forward to the same monitoring session.

Once the source and the destination of the monitor session are determined, method 400 may proceed to stage 450 where network packets may be forwarded from the source to the destination. The source may be operative to, for example, replicate each packet of information and attach an outer TRILL header to the replicated packet. The outer TRILL header may specify the virtual nickname tied to the monitoring session. Switches in network 100 may then forward the replicated frame to the destination based on the virtual nickname specified in the outer TRILL header. The destination, once in receipt of the replicated packet, may parse the outer TRILL header and read an original TRILL header that may have accompanied the packet as disclosed above with reference to FIG. 2. Method 400 may then end at stage 460.

An embodiment consistent with the disclosure may comprise a network comprising a core switch; at least two access switches; at least one distribution switch positioned between the core switch and the at least two access switches. The network may be operative to perform the following stages: receiving an indication that a monitoring station has connected to an edge switch of a network; configuring the edge switch of the network with a nickname associated with a monitoring session; setting, in response to the configuration, the monitoring station as a destination for a network frame to be monitored by the monitoring session; announcing, throughout the network, that the edge network switch is tied to the nickname assigned to the monitoring session; configuring a source that is to be monitored by the monitoring session with the nickname associated with the monitoring session; and forwarding the network frame from the source to the destination.

Figure 5:
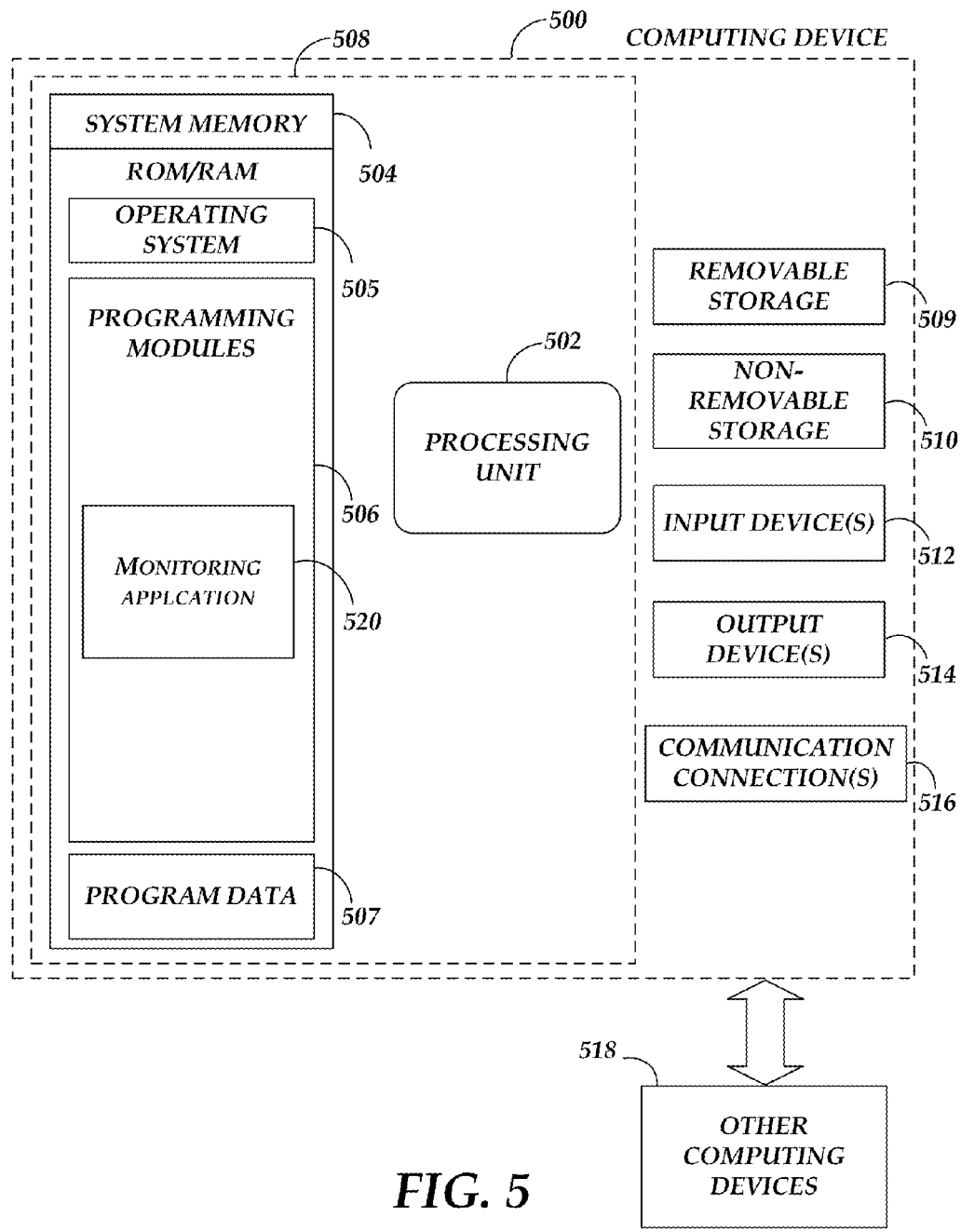
FIG. 5 is a block diagram of a system including a monitoring station in a TRILL network.

FIG. 5 is a block diagram of a system including server (or computing device) 500. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the disclosure. Furthermore, computing device 500 may comprise an operating environment for system 100 as described above. System 100 may operate in other environments and is not limited to computing device 500.

With reference to FIG. 5, a system consistent with an embodiment of the disclosure may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include, for example, monitoring application 520. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g. monitoring application 520) may perform processes including, for example, one or more method 300's stages as described above. The aforementioned process is an example, and processing unit 502 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

We claim:

1. A method comprising:
   assigning, by a network device, a nickname to a switch port analyzer (SPAN) monitoring session comprising a first SPAN destination;
   adding, by the network device, a second SPAN destination to the SPAN monitoring session, wherein adding the second SPAN destination comprises assigning the nickname associated with the SPAN monitoring session to the second SPAN destination and setting the second SPAN destination as an alternate destination for a network frame to be monitored by the SPAN monitoring session, wherein the SPAN monitoring session is initiated at a routing bridge of a network, wherein the routing bridge is configured to flood the network with reachability to the nickname corresponding to the SPAN monitoring session in the network, and wherein the first and second SPAN destinations are decoupled from a SPAN source, and wherein the SPAN source is configured to encapsulate a SPAN copy of network traffic passing through the SPAN source into one or more packets with packet destination specifying the nickname of the SPAN monitoring session; and
   enabling each of the first and second SPAN destinations to monitor more than one SPAN monitoring session.

2. The method of claim 1, further comprising:
   assigning the nickname to each SPAN monitoring session enabled by the first SPAN destination.

3. The method of claim 2, further comprising:
   associating the nickname to one or more SPAN monitoring sessions enabled by the first SPAN destination.

4. The method of claim 2, further comprising configuring the SPAN source with the SPAN monitoring session enabled by the first and second SPAN destinations.

5. The method of claim 1, wherein flooding the network with reachability to the nickname corresponding to the SPAN monitoring session is implemented through Layer 2 intermediate system-to-intermediate system (ISIS) protocol.

6. The method of claim 1, further comprising:
   encapsulating the SPAN copy of network traffic passing through the SPAN source into one or more transparent interconnection of lots of links (TRILL) packets containing the nickname of the SPAN monitoring session.

7. A method comprising:
   allocating a pool of virtual nicknames for assignment to switch port analyzer (SPAN) sessions;
   selecting, at a first monitoring station, a virtual nickname from the pool of virtual nicknames for one or more SPAN monitoring sessions to be monitored by the first monitoring station, wherein the first monitoring station is configured to flood reachability to the virtual nickname corresponding to the one or more SPAN monitoring sessions;
   assigning the virtual nickname to the one or more SPAN monitoring sessions comprising a first SPAN destination;
   adding a second SPAN destination to the one or more SPAN monitoring sessions, the first monitoring station being the first SPAN destination for the one or more SPAN monitoring sessions, wherein adding the second SPAN destination comprises assigning the virtual nickname associated with the one or more SPAN monitoring sessions to the second SPAN destination and setting the second SPAN destination as an alternate destination for a network frame to be monitored by the one or more SPAN monitoring sessions, and wherein the first and second SPAN destinations are decoupled from a source device associated with the one or more SPAN monitoring sessions; and
   enabling the source device to encapsulate a SPAN copy of network traffic passing through the source device into one or more packets with packet destination specifying the virtual nickname of the one or more SPAN monitoring sessions.

8. The method of claim 7, wherein each virtual nickname represents a single SPAN session.

9. The method of claim 7, further comprising:
   announcing the virtual nickname to a plurality of network devices, wherein the virtual nickname identifies the first monitoring station as the first SPAN destination for the one more SPAN monitoring sessions.

10. The method of claim 7, further comprising:
    configuring the source device for the one or more SPAN monitoring sessions with the virtual nickname.

11. The method of claim 10, further comprising:
    monitoring network traffic sent through the source device.

12. The method of claim 11, further comprising:
    routing monitored network packets to each SPAN destination associated with the one or more SPAN monitoring sessions using transparent interconnection of lots of links (TRILL) multipathing.

13. The method of claim 7, wherein the first monitoring station is an edge node in a transparent interconnection of lots of links (TRILL) network.

14. A network device comprising:
    a memory;
    one or processors configured to execute instructions stored in the memory, the instructions comprising:
        assigning a nickname to a switch port analyzer (SPAN) monitoring session comprising a first SPAN destination;
        adding a second SPAN destination within the SPAN monitoring session, wherein adding the second SPAN destination comprises assigning the nickname associated with the SPAN monitoring session to the second SPAN destination and setting the second SPAN destination as an alternate destination for a network frame to be monitored by the SPAN monitoring session, wherein the SPAN monitoring session is being initiated at network device associated with a network, wherein the network device is configured to flood the network with reachability to the nickname corresponding to the SPAN monitoring session, and wherein the first and second SPAN destinations are decoupled from a SPAN source configured to encapsulate a SPAN copy of network traffic passing through the SPAN source into one or more packets with packet destination specifying the nickname of the SPAN monitoring session; and
        enabling each of the first and second SPAN destinations to monitor more than one SPAN monitoring session.

15. The network device of claim 14, wherein the instructions further comprise:
    assigning one of the first and second SPAN destinations as a destination for the network frame to be monitored by the SPAN monitoring session at the network device.

16. The network device of claim 14, wherein the instructions further comprise:
    announcing throughout the network, that one of the first and second SPAN destinations is tied to the nickname assigned to the SPAN monitoring session.

17. The network device of claim 16, wherein the instructions further comprise:
    configuring a source device that is to be monitored by the SPAN monitoring session with the nickname associated with the SPAN monitoring session.

18. The network device of claim 16, wherein the instructions further comprise:
    adding an outer header to a replicated network frame, the outer header indicating the nickname associated with the SPAN monitoring session.

19. The network device of claim 16, wherein the instructions further comprise:
    assigning the nickname associated with the SPAN monitoring session to another monitoring station connected to another network device of the network.

* * * * *